US010826802B2

(12) United States Patent
Pestana et al.

(10) Patent No.: US 10,826,802 B2
(45) Date of Patent: Nov. 3, 2020

(54) MANAGING NETWORK COMMUNICATION PROTOCOLS

(71) Applicant: OBSERVEPOINT, INC., Provo, UT (US)

(72) Inventors: John Pestana, Provo, UT (US); Robert K. Seolas, Alpine, UT (US); Tyler Broadbent, Lehi, UT (US); Daniel Reno, Orem, UT (US); Gregory N. Larson, Orem, UT (US)

(73) Assignee: OBSERVEPOINT, INC., Provo, UT (US)

( * ) Notice: Subject to any disclaimer, the term of this patent is extended or adjusted under 35 U.S.C. 154(b) by 0 days.

(21) Appl. No.: 14/917,251

(22) PCT Filed: Feb. 9, 2016

(86) PCT No.: PCT/US2016/017194
§ 371 (c)(1),
(2) Date: Mar. 7, 2016

(87) PCT Pub. No.: WO2017/138926
PCT Pub. Date: Aug. 17, 2017

(65) Prior Publication Data
US 2017/0230258 A1 Aug. 10, 2017

(51) Int. Cl.
*H04L 12/26* (2006.01)
*H04L 29/08* (2006.01)

(52) U.S. Cl.
CPC ............ *H04L 43/04* (2013.01); *H04L 43/062* (2013.01); *H04L 67/02* (2013.01); *H04L 67/10* (2013.01); *H04L 67/125* (2013.01)

(58) Field of Classification Search
CPC ....... H04L 43/04; H04L 43/062; H04L 67/02; H04L 67/10; H04L 67/125

(Continued)

(56) References Cited

U.S. PATENT DOCUMENTS 6,470,383 B1 10/2002 Leshem et al.
7,502,994 B2 3/2009 Kocol
(Continued)

FOREIGN PATENT DOCUMENTS

CA 2992605 12/2016
KR 1020150079867 7/2015
(Continued)

OTHER PUBLICATIONS

International Search Report and Written Opinion for application No. PCT/US2017/016553 dated Jun. 5, 2017.
(Continued)

*Primary Examiner* — Backhean Tiv
*Assistant Examiner* — Schquita D Goodwin
(74) *Attorney, Agent, or Firm* — Workman Nydegger

(57) ABSTRACT

A computer system for managing network communication protocols comprises computer-executable instructions that configure the computer system to receive a dataset of information for network-based analytic elements. The dataset can comprise information received by a network-based destination of the analytic elements. The analytic elements may have been executed within a network-connected software application. The system can also be configured to identify a pattern within the dataset of information. Based upon the identified pattern, the system can create an analytic element rule that is configured to describe the identified pattern on at least a subset of network-based analytic elements that are executable within the network-connected software application. Additionally, the system can be configured to store, within a digital database, the analytic element rule, wherein the digital database comprises a set of analytic element rules for managing analytic elements within the network-connected software application.

18 Claims, 5 Drawing Sheets

(58) Field of Classification Search
USPC .......................................................... 709/224
See application file for complete search history.

(56) References Cited

U.S. PATENT DOCUMENTS

| | | | |
|---|---|---|---|
| 8,239,820 B1 | 8/2012 | White et al. | |
| 8,955,149 B1* | 2/2015 | Baer .................... | G06F 21/6218 709/229 |
| 9,357,366 B2 | 5/2016 | Seolas | |
| 9,690,764 B1 | 6/2017 | Batni | |
| 9,842,133 B2 | 12/2017 | Seolas | |
| 2002/0120779 A1* | 8/2002 | Teeple ................. | H04L 67/2842 709/246 |
| 2003/0217191 A1* | 11/2003 | Gao ........................... | G06F 8/38 719/320 |
| 2006/0107306 A1 | 5/2006 | Thirumalai et al. | |
| 2006/0167717 A1* | 7/2006 | Desenberg ........ | G06F 17/30864 705/26.1 |
| 2007/0239726 A1 | 10/2007 | Weiss et al. | |
| 2008/0104542 A1* | 5/2008 | Cohen ............... | G06F 17/30864 715/810 |
| 2009/0024583 A1* | 1/2009 | Jaiswal ............... | G06F 16/9535 |
| 2009/0150262 A1 | 6/2009 | Mizhen | |
| 2009/0327858 A1 | 12/2009 | Tsun | |
| 2010/0017880 A1* | 1/2010 | Masood .................. | G06F 21/51 726/24 |
| 2010/0083215 A1* | 4/2010 | Bogl ........................ | G06F 8/10 717/105 |
| 2010/0138437 A1 | 6/2010 | Nadig et al. | |
| 2011/0035486 A1 | 2/2011 | Seolas | |
| 2011/0153796 A1 | 6/2011 | Branson | |
| 2011/0161922 A1* | 6/2011 | Gerken ..................... | G06F 8/35 717/106 |
| 2011/0185016 A1 | 7/2011 | Kandasamy et al. | |
| 2011/0302510 A1 | 12/2011 | Harrison | |
| 2012/0059706 A1* | 3/2012 | Goenka ............. | G06Q 30/0242 705/14.41 |
| 2012/0066583 A1 | 3/2012 | Priestley | |
| 2013/0066724 A1* | 3/2013 | Evans ................ | G06Q 30/0255 705/14.66 |
| 2013/0145349 A1* | 6/2013 | Basak ................. | G06F 9/44505 717/121 |
| 2013/0174047 A1 | 7/2013 | Sivakumar et al. | |
| 2013/0226863 A1* | 8/2013 | Jonker .................... | H04L 41/00 707/609 |
| 2013/0332277 A1 | 12/2013 | Faith | |
| 2013/0337789 A1 | 12/2013 | Johnson | |
| 2013/0346851 A1 | 12/2013 | Leece | |
| 2014/0129540 A1 | 5/2014 | Riley et al. | |
| 2014/0164350 A1 | 6/2014 | Landa et al. | |
| 2014/0195510 A1 | 7/2014 | Jourdan | |
| 2014/0223408 A1* | 8/2014 | Wunderlich, Jr. ........ | G06F 8/36 717/101 |
| 2014/0280012 A1* | 9/2014 | Feuerlein .............. | G06F 16/951 707/709 |
| 2014/0297836 A1 | 10/2014 | Cohen | |
| 2014/0330835 A1 | 11/2014 | Boyer | |
| 2015/0026201 A1 | 1/2015 | Mukherjee et al. | |
| 2015/0067839 A1* | 3/2015 | Wardman ............ | G06F 16/9566 726/22 |
| 2015/0134685 A1 | 5/2015 | Satishkumar | |
| 2015/0135061 A1 | 5/2015 | Palanichamy | |
| 2015/0302052 A1* | 10/2015 | Galarneau ............ | G06F 16/245 707/736 |
| 2016/0048602 A1* | 2/2016 | Yastrebenetsky ....... | H04L 67/02 715/234 |
| 2016/0086215 A1* | 3/2016 | Wang ................. | G06Q 30/0246 705/14.45 |
| 2016/0132048 A1* | 5/2016 | Kambe ............ | G05B 19/41845 700/87 |
| 2016/0188552 A1 | 6/2016 | Wang | |
| 2016/0253679 A1 | 9/2016 | Venkatraman | |
| 2016/0259717 A1 | 9/2016 | Nychis | |
| 2016/0364771 A1* | 12/2016 | Nielsen ................... | H04L 67/02 |
| 2017/0046438 A1* | 2/2017 | Desineni ............. | G06F 16/9535 |
| 2017/0103058 A1 | 4/2017 | Gandhi | |
| 2017/0169443 A1* | 6/2017 | Martinez, Jr. ....... | G06F 17/2235 |
| 2017/0255445 A1 | 9/2017 | Seolas | |
| 2017/0255475 A1 | 9/2017 | Seolas | |
| 2018/0137351 A1 | 5/2018 | Hopen | |
| 2018/0139222 A1* | 5/2018 | Wan .................... | H04L 63/1458 |

FOREIGN PATENT DOCUMENTS

| | | |
|---|---|---|
| WO | 2004079551 | 9/2004 |
| WO | 2017078705 | 5/2017 |
| WO | 2017138926 | 8/2017 |

OTHER PUBLICATIONS

Non-Final Office Action for U.S. Appl. No. 14/914,590 dated Jul. 25, 2018.
International Search Report for application No. PCT/US2015/059064 dated Aug. 4, 2016.
International Search Report for application No. PCT/US2016/017194 dated Nov. 1, 2016.
Notice of Allowance for U.S. Appl. No. 15/502,864 dated Feb. 20, 2019.
Notice of Allowance for U.S. Appl. No. 14/914,590 dated Nov. 13, 2018.
Non-Final Office Action for U.S. Appl. No. 15/502,864 dated Sep. 27, 2018.
Non-Final Office Action for U.S. Appl. No. 14/917,251 dated Oct. 3, 2018.
Final Office Action for U.S. Appl. No. 14/917,251 dated May 10, 2010.

* cited by examiner

MANAGING NETWORK COMMUNICATION PROTOCOLS

CROSS-REFERENCE TO RELATED APPLICATIONS

The present invention is a 35 U.S.C. § 371 U.S. National Stage of PCT Application No. PCT/US16/17194, filed on Feb. 9, 2016, the entire content of which is incorporated herein by reference.

BACKGROUND OF THE INVENTION

1. Technical Field

Implementations of the present invention relate to network communication analysis.

2. Background and Relevant Art

As the Internet and the accompanying Internet commerce have expanded, various website owners have sought to track a variety of data about individuals who visit their websites and/or use their applications (in particular within the mobile application space). Website owners often wish to gather a variety of different analytic data about the visitors who view their webpage or use their applications. In many cases, this analytic data can be used to determine things such as what advertisements to display to a visitor and what fees should be paid to various external advertisers.

One conventional method for generating analytic data on website visitors is through the use of analytic elements (e.g., "tags"). As used here, an "analytic element" comprises a network request initiated by a client based upon content that is delivered to the client. Oftentimes, the analytic element can provide a system for tracking users of a network-connected software application. As used herein, a network-connected software application can comprise any application that accesses resources over a local or wide area network, such as an internet browser. In at least one conventional form such as when used in the context of an internet web browser, a tag is a hidden element within a webpage that causes some action to occur on a webpage when it is fired. In particular, in at least one implementation, a tag is a piece of code that is placed within a webpage and allows a webpage owner to track information about the visitors who download and execute the particular piece of code. For example, a tag can comprise a transparent GIF or a tracking pixel, which is placed within the code of a webpage. The actual transparent GIF or tracking pixel can be stored on a separate server from the actual webpage. The tag is fired when the browser requests the transparent GIF or tracking pixel from the separate server. When the separate server receives the request from the browser, the server can gather various analytic data about the requestor.

Similar methods can also be used within applications to generate analytic data on the application users. For example, many applications, especially mobile applications, request data (e.g., via html code) from remote servers and display content within the application based upon the received data. The displayed content may take the form of in-game advertisements, video content, music content, and other similar content. Similar to the tags described above in webpages, tags can be executed within the application that allow a server to gather various analytic data about the application user.

Once executed, an analytic element can gather information such as the visitor's origination (e.g., the referring webpage or search engine), what keywords were used to find the webpage, whether a particular advertisement directed a visitor to the page, and other related data. In many situations, a single webpage can comprise multiple analytic elements from a variety of different parties. For example, a particular webpage may contain a GOOGLE Analytics tag, a FACEBOOK tag, a page-counter Tag, a weather tag, and other similar analytic elements.

Properly and efficiently tracking large websites with thousands to millions of unique analytic elements and applications with similarly large collections of analytic elements can be a tremendously challenging undertaking. For example, analytic elements that do not comply with analytic rules may be incorrectly accounted for, not accounted for, or may require significant additional processing to correctly identify. Additionally, source code associated with analytic elements that do not comply with analytic rules may be extremely cumbersome to update and manage. For instance, a web administrator may desire to update an entire set of analytic elements spread throughout a large website. Analytic elements that do not comply with correct naming conventions, as defined by the analytic rules, may be difficult or impossible to detect within the website, and thus difficult or impossible to uniformly update. Accordingly, there are a number of problems in the art relating to the creation of rules for a tag management system that can be addressed.

BRIEF SUMMARY OF THE INVENTION

Implementations of the present invention comprise systems, methods, and apparatus configured to manage network-based analytic elements. In particular, implementations of the present invention comprise computer systems for analyzing a dataset of received network communications. The computer system can automatically identify within the dataset patterns that appear to describe at least a portion of the received network communications. The computer system can then create a rule that describes the patterns, and which can be enforced within source code that generates the analytic elements.

Implementations of a computer system for managing network communication protocols can comprise computer-executable instructions that configure the computer system to receive a dataset of information for network-based analytic elements. The dataset can comprise information received by a network-based destination of the analytic elements. The analytic elements may have been executed within a network-connected software application. The system can also be configured to identify, with a computer processor, a pattern within the dataset of information. Based upon the identified pattern, the system can create an analytic element rule that is configured to describe the identified pattern on at least a subset of network-based analytic elements that are executable within the network-connected software application. Additionally, the system can be configured to store, within a digital database, the analytic element rule, wherein the digital database comprises a set of analytic element rules for managing analytic elements within the network-connected software application.

In addition, implementations of a computer-executed method for managing network communication protocols can comprise receiving, at a computer system, a dataset of information for network-based analytic elements. The dataset can comprise information received by a network-based destination of the analytic elements. The analytic elements may have been executed within a network-connected software application. The method can also comprise identifying, with a computer processor, a pattern within the dataset of information. Additionally, the method can comprise searching, within a database of analytic rules, for an analytic rule that describes at least a portion of the identified pattern. Based upon identified differences in the identified pattern and the analytic rule, the method can comprise updating the analytic rule to incorporate the differences. Further, the method can comprise storing, within the database of analytic rules, the analytic rule, wherein the database of analytic rules comprises a set of analytic rules for managing analytic elements within the network-connected software application.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and apparatus configured to manage network-based analytic elements. In particular, implementations of the present invention comprise computer systems for analyzing a dataset of received network communications. The computer system can automatically identify within the dataset patterns that appear to describe at least a portion of the received network communications. The computer system can then create a rule that describes the patterns, and which can be enforced within source code that generates the analytic elements.

Accordingly, implementations of the present invention can significantly increase the reliability and speed at which network analytic information can be gathered. Additionally, implementations of the present invention can provide novel, unitary systems for managing high volumes of analytic elements. Once properly managed, the analytic elements are more readily updated and errors are more easily identified. As such, implementations of the present invention provide significant technical benefits to the field.

Figure 1:
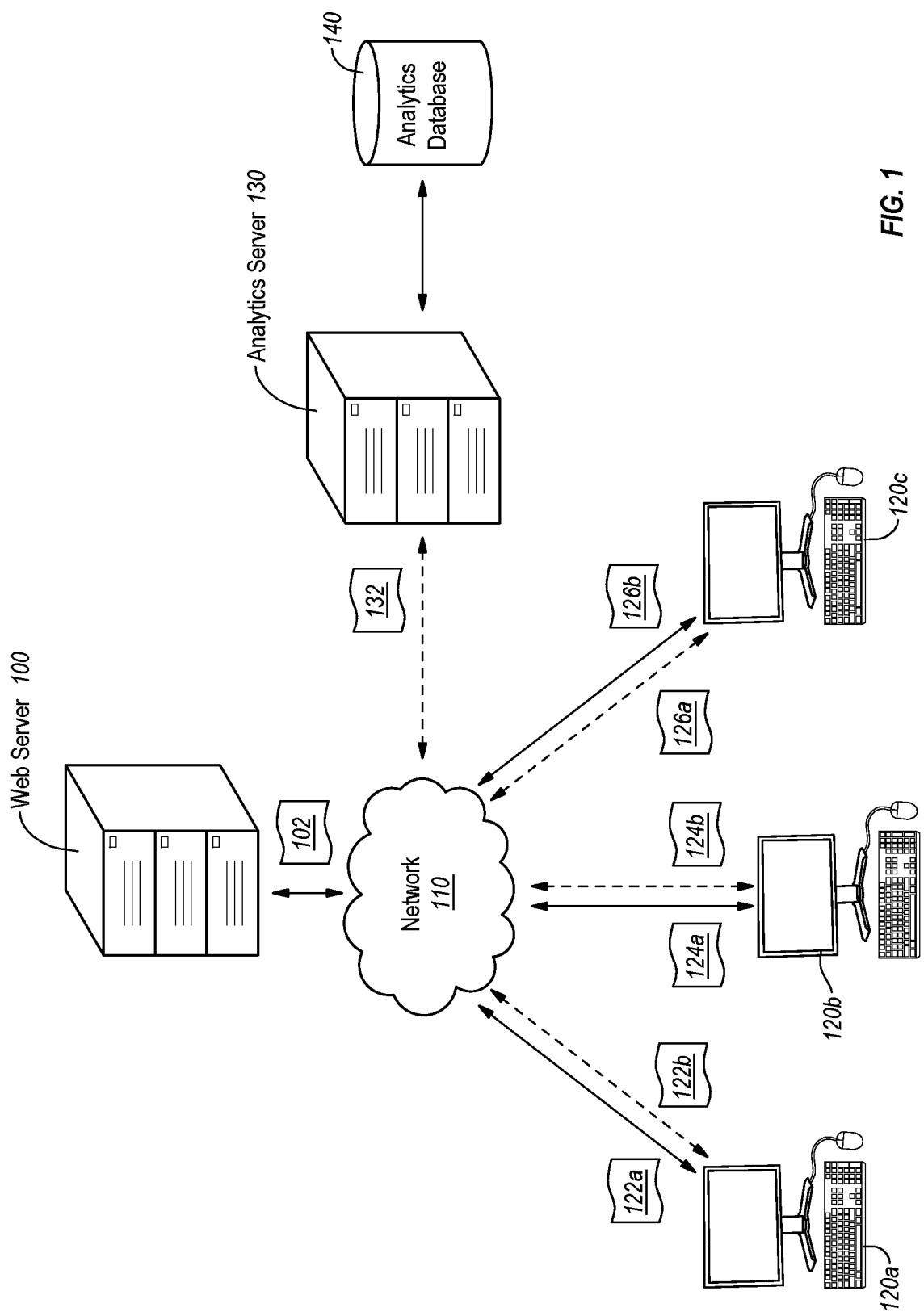
FIG. 1 illustrates a schematic of a network-based analytic element tracking system in accordance with implementations of the present invention.

Turning now to the figures, FIG. 1 illustrates a schematic of a network-based analytic element tracking system in accordance with implementations of the present invention. In particular, FIG. 1 depicts a group of end-user computers 120(a-c) in communication with a web server 100 through a network connection 110. One will understand that the depicted schematic is merely exemplary and that far more than three end-user computers 120(a-c) may be in communication with a web server 100 over a network connection 110. Additionally, in at least one implementation, mobile computing devices instead of, or in addition to, the end-user computers 120(a-c) can request data from the web server 100 through the network 110.

In at least one implementation, each end-user computer 120(a-c) requests 122a, 124a, 126a data from web server 100. The requests 122a, 124a, 126a may be generated from within web browsers, software applications, or any other location within the end-user computers 120(a-c). In response to the request 122a, 124a, 126a for data, web server 100 may transmit back to each respective end-user computer 120(a-c) the requested data, along with an analytic element 102.

In at least one implementation, the analytic element 102 can comprise an HTML tag, Such as a transparent pixel request, that requests data from a remote analytics server 130. When executed, the analytic element 102 can cause the end-user computers 120(a-c) to each request data 122b, 124b, 126b from the remote analytics server 130. When receiving the requests 122b, 124b, 126b from the end-user computers 120(a-c), the analytics server 130 can log the requests 122b, 124b, 126b, log any associated variables, log various analytic information about the request, and store in the information within an analytics database 140. The analytics server 130 can then communicate the transparent pixel 132, for example, to the end-user computers 120(a-c). While the above description is provided with respect to HTML tags, in at least one implementation, the present invention can be easily adapted to alternative analytic tracking methods. For example, some analytic methods do not rely upon tags that fire requests to external servers. Instead, some analytic methods gather all of the analytic data of interest within the web server 100. In such a case, the web server 100 can store the gathered analytics data within the analytics database 140, which may be local to the web server 100.

Accordingly, FIG. 1 depicts a schematic of an implementation of a system for gathering analytic information. As depicted, the analytics server 130 can gather information from a large number of end-user computers 120(a-c) that are accessing a web server 100 (and accompanying website) of interest. Additionally, various different webpages hosted by the webserver 100 may comprise unique analytic elements that comprise various specific attributes such as, but not limited to, specific variables, specific names, specific paths, and other similar characteristics. Each of these specific attributes may be pre-determined by a website administrator in order to efficiently track the desired analytic information. For example, specific webpages may be associated with a language variable that can be stored within the analytics database 140. The language variable may be informative to the website administrator in identifying what language to generate new content in, what language advertisements should be provided in, and various other demographic specific determinations.

Figure 2:
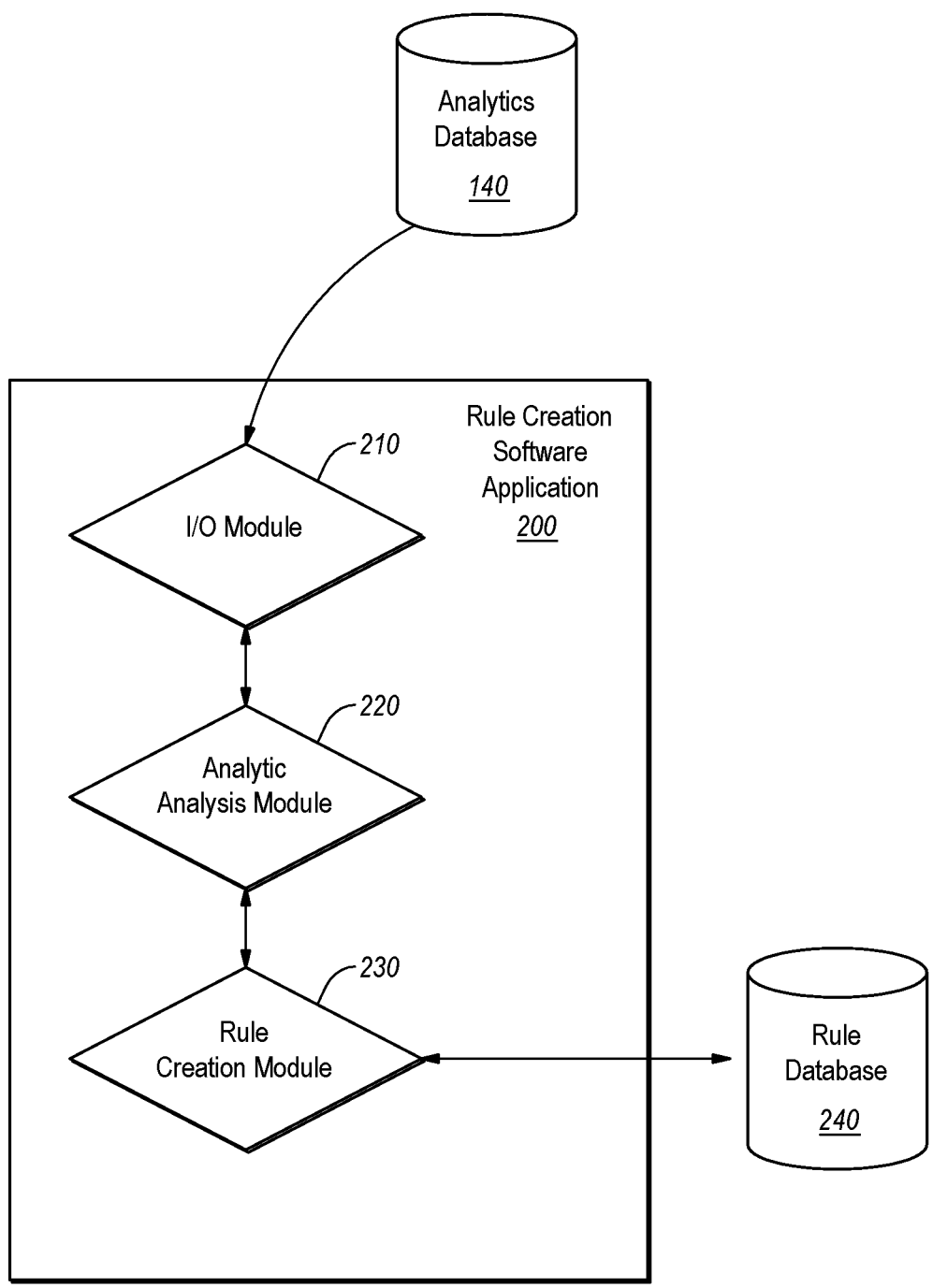
FIG. 2 illustrates a schematic of a network-based analytic element rule-creation system in accordance with implementations of the present invention.

FIG. 2 illustrates a schematic of a network-based analytic element rule-creation system in accordance with implementations of the present invention. A dataset of analytics information from the analytics database 140 of FIG. 1 can be provided to a rule creation software application 200. The rule creation software application 200 may be executed at web server 100, analytics server 130, or any other computing system. In at least one implementation, the rule creation software application 200 is executed at end-user computer system 120a, which is an analytic element audit system, as further described below.

In at least one implementation, the analytics database 140 provides analytics information to the rule creation software application 200 through a network connection. The information can be provided through a constant real-time feed, such that the rule creation software application 200 has the analytic information as it is being generated. Alternatively, the rule creation software application 200 can receive the information periodically. In any case, the rule creation software application 200 can receive, from the analytics database 140, analytics information generated by all, or a portion of, the visitors to a particular web site hosted by web server 100.

Once the analytics information has been received by I/O module 210 within the rule creation software application 200, the IO module 210 can provide the information to an analytics analysis module 220, which can analyze the data and identify patterns. The analytics analysis module 220 can implement any of a number of known pattern recognition algorithms to identify patterns within the analytics information. For example, the analytics analysis module 220 may identify that a majority of the analytics information comprises a bread crumb naming convention (e.g., "main>store>furniture>beds>Kids Pirate Bed"), while a few outliers comprise a URL-based naming convention. Similarly, the analytics analysis module 220 may identify that at least a majority of analytics elements with a specific set of attributes, also comprise a language variable. One will understand that the above stated patterns are merely exemplary and that conventional pattern recognition algorithms are capable of identifying a wide variety of additional patterns.

The analytics analysis module 220 can communicate the identified patterns to the rule creation module 230. In at least one implementation, the rule creation module 230 can be configured to create an analytics rule based upon one or more of the identified patterns and store the rule within the rule database 240. For example, the rule creation module 230 can create a rule that the analytic elements associated with the web server 100 should all comprise a bread crumb naming convention. The resulting rule may describe the format for the bread crumb naming convention. The resulting rule may then be applied against received analytic information to determine if the information conforms with the rule. Additionally, the resulting rule may be capable of implementing changes within the source code associated with analytics elements, such that non-conforming analytics elements can be adjusted to conform with the rule.

In at least one implementation, the rule creation module 230 must first determine if the pattern identified by the analytics analysis module 220 should be created into a rule. For example, in various embodiments, the analytics analysis module 220 may identify a pattern that is present in only a portion of the analytics information. In determining whether to create a rule from the patterns, the rule creation module 230 can determine whether the pattern was identified in more than a threshold portion of the analytics information. For example, if the pattern was identified in ninety-nine percent of the analytics information, the rule creation module 230 may determine that the non-conforming analytics information comprise outliers and that the rule should be created. In various implementations, the threshold amount may vary based upon user entered criteria.

Additionally, various rule seeds can be provided to the rule creation module 230. The rule seeds may comprise common rule templates. For example, a rule seed may be associated with the bread crumb naming convention. Additionally, a website specific rule seed can be provided that describes specific variable types that should be associated with specific analytic elements. Using the rule seeds, the rule creation module 230 can create rules based upon patterns that would fit within the particular rule seeds.

In at least one implementation, the rule creation module 230 can also search the rule database 240 for analytic rules, before creating a new rule. For example, the rule creation module 230 may determine that an identified pattern is already described by a rule within the rule database 240. In contrast, in at least one implementation, the rule creation module 230 can determine that a pattern is only partially described by a rule within the rule database 240. For example, a rule may exist that requires a certain variable to be associated with a particular group of analytic elements. The rule creation module 230, however, may determine that a pattern is present which associates an additional variable with the particular group of analytic elements. Based upon that determination, the rule creation module 240 can either adjust the pre-existing rule to include the additional variable or create a new rule that describes the identified pattern.

In determining whether a pre-existing rule should be changed or replaced, the rule creation module 240 can analyze the age of the pre-existing rule, whether the pre-existing rule is associated with a write-protection flag, whether the identified pattern is wide spread, and the age of the analytic information. For example, the rule creation module 240 may analyze the age of the pre-existing rule by determining that recently created rules should not be changed for a threshold period of time. Similarly, the rule creation module 240 may analyze the age of the pre-existing rule by determining that long-existing rules should be given deference, unless a majority of the analytics data violates the rule. In such a case, the rule creation module 230 can create a user-directed prompt to determine if the old rule should be changed or overwritten.

Similarly, the rule creation module 240 can give deference to a rule that is newer than the analytics elements. For example, the rule may be recently created by the website administrator, and the identified additional variable may be non-conforming. As such, in at least one implementation the rule creation module will not manipulate a pre-existing rule that is newer than the analytics information in which the pattern was identified. Further, in at least one implementation, a user may be able to explicitly set a write-protection flag with one or more rules that prevents the rule creation module 230 from overwriting or adjusting the rule.

Figure 3:
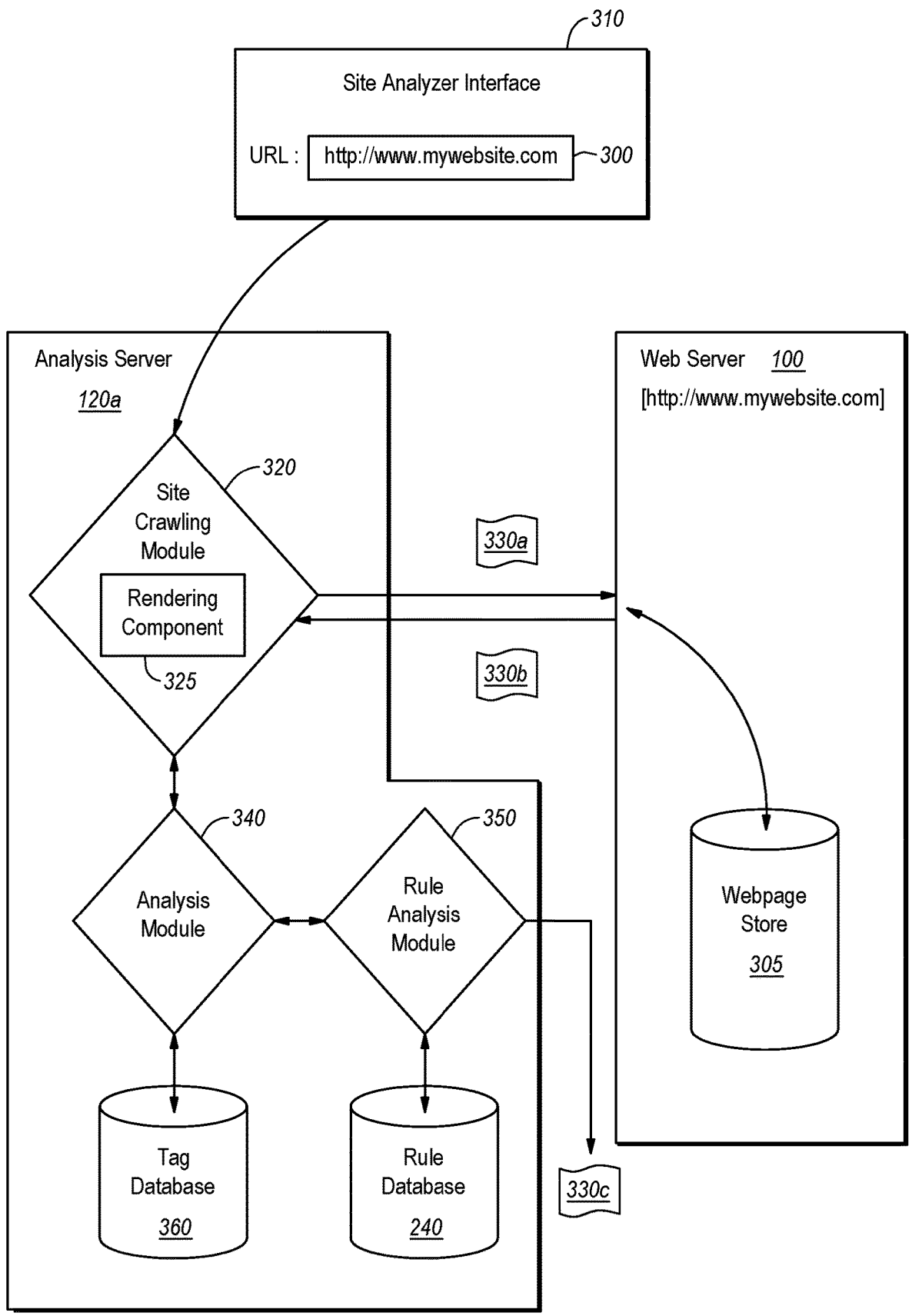
FIG. 3 illustrates a schematic of a network-based analytic element audit system in accordance with implementations of the present invention.

FIG. 3 illustrates a schematic of a network-based analytic element audit system in accordance with implementations of the present invention. The network-based analytic element audit system may be executed within an analytics server 130, a web server 100, or within an end-user computer 120a that is configured to audit webservers. For simplicity and clarity, the examples provided herein will relate to a network-based analytic element audit system executed by the end-user computer 120a. In at least one implementation, the network-based analytic element audit system can generate a site analyzer interface 310 at the end-user computer 120a (i.e., the analysis server). The analysis server 120a receives from the site analyzer interface 310 a URL 300 to be analyzed. The analysis server 120a comprises a site crawling module 320, an analysis module 340, a rule analysis module 350, a tag database 360, and a rule database 240.

The analysis server 120a can access the provided URL 300 and communicate with the web server 100 that is associated with the URL 300. As depicted in FIG. 3, the web server 100 can comprise a webpage store 305, where the actual website content is stored. For example, a webpage store 305 can store the source code of each webpage of a website. Additionally, a webpage store 305 can store multimedia content that is accessible through the webpages.

In FIG. 3 and throughout the present application, web server 100 is depicted and described as being a unitary system. One will understand, however, that a web server 300 can be composed of multiple servers and multiple webpage stores 305. In at least one implementation, the analysis server 120a can access the webpage stores 305 on each of the servers that is associated with a particular webpage.

FIG. 3 shows that a user can enter a URL 300 into a site analyzer interface 310. The site analyzer interface 310 can then communicate the URL 300 to the analysis server 120a. In this application, a URL 300 of "http://www.mywebsite.com" is used for exemplary purposes, but one will understand that any number of different URLs 300 can be entered into the site analyzer interface 310.

Once the analysis server 120a has received the URL 300, the site crawling module 320 sends communication packets 330a to the web server 100 that is associated with the URL 300 and receives response communication packets 330b from the web server 100. In the depicted case, the site crawling module 320 accesses http://www.mywebsite.com. Specifically, the site crawling module 320 accesses the webpage store 305 that is associated with the web server 100. In at least one implementation, the site crawling module 320 can then crawl, using methods that are known in the art, through the entire website that is associated with URL 300.

In at least one implementation, the site crawling module 320 can include a rendering component 325. The rendering component 325 can render the information contained in the packets 330b that are received from the web server 100. For example, the rendering component 325 can render a JAVA or FLASH portion of a webpage. Once rendered, the site crawling module 320 can crawl the rendered portion of the webpage and identify additional tags that were not otherwise visible.

In some cases, crawling a rendered webpage may provide additional information than what would be available if only the source code is crawled. In particular, a particular webpage may contain multimedia content that contains attributes of interest that are only visible when the multimedia content is activated. In at least one implementation, the rendering component 325 can enable the site crawling module 320 to access these attributes of interest by rendering and activating at least a portion of the content that is embedded within a webpage that is stored within the webpage store 305. As the site crawling module 320 crawls a website, the data 330b that is received from the webpage store 305 can be sent to the analysis module 340. The analysis module 340 can analyze the webpage content to identify tags that are associated with each webpage of the website. Additionally, in at least one implementation, the analysis module 340 can determine the configurations of identified tags. For example, in at least one implementation, the analysis module 340 can determine that specific variables are associated with a particular tag.

In at least one implementation, the analysis module 340 also receives rendered information from the rendering component 325 of the site crawling module 320. The analysis module 340 can analyze the rendered information and identify tags that are associated with a particular webpage. In particular, in at least one implementation, the analysis module 340 can identify a tag as the tag is executed. For example, the analysis module 340 may identify that a particular piece of code requests information from either an unidentified server or from a server that is known to be associated with tag products.

Further, in at least one implementation, the analysis module 340 can identify tags that are associated with rich content or multimedia content. For example, in some multimedia files, tags are configured to fire at particular points in the multimedia file, allowing the multimedia provider to identify how much of a particular file was viewed. In at least one implementation, the analysis module 340 can analyze the entire multimedia file and identify the tags and configurations of tags that are associated with the multimedia file.

In at least one implementation, the analysis module 340 identifies the tags that are associated with each webpage by referencing a tag database 360. In particular, the analysis module 340 can compare the source code of a particular website to all of the known tags within the tag database 360. For example, the analysis module 340 may analyze a particular webpage that contains a FACEBOOK tag. The analysis module 340 can compare the source code of the particular webpage to known tags that are contained within the tag database 360. The tag database 360 may contain a signature of the FACEBOOK tag. Using the signature for the FACEBOOK tag that is stored in the tag database 360, the analysis module 340 can identify that the particular webpage contains a FACEBOOK tag.

In at least one implementation, the signatures within the tag database 360 may be actual copies of the known tags. In another implementation, the signatures may be based upon specific attributes of tags, such that the analysis module identifies a tag by identifying the specific attributes within a portion of the data 330b communicated from the site crawling module 320.

Additionally, in at least one implementation, the tag database 360 may also contain characteristics that are associated with each tag. For example, the data database may contain information about the variables, if any, that are commonly associated with specific tags. In addition, the tag database 360 may also contain information about past version of tags, such that the analysis module 340 can identify whether a particular tag is up-to-date. Further, in at least one implementation, the tag database 360 may contain information that enables the analysis module 340 to identify undesirable tags (e.g., tags that are deemed unsecure, tags that steal user information, etc.).

After identifying at least one tag, the analysis module 340 can communicate with the rule analysis module 350. In at least one implementation, the analysis module 340 communicates the tag identity, configuration, and associated webpage to the rule analysis module 350. For example, the analysis module 340 may communicate to the rule analysis module 350, that a Google Analytics tag is present on webpage "http://www.mywebsite.com/page1." Further, the analysis module 340 may communicate to the rule analysis module 350 any variables that are associated with the tag.

In at least one implementation, the rule analysis module 350 can retrieve one or more rules from the rule database 240 and verify whether the identified tag conforms to the rules. For example, the rule analysis module 350 can determine whether the tag follows the proper bread crumb naming convention. Based upon the determination of the rule analysis module 350, various actions can be taken, as explained below.

As indicated above, the analysis server 120*a* may be configured to perform a walk-through of a particular website. The walk-through may comprise pre-loading a particular user profile and stepping through pages on a website. The particular user profile may comprise cookie information that is intended to translate into specific analytic element attributes, such as language. The analysis server 120*a* can analyze source code and track network communications to identify analytic elements (e.g., tags) that fire in response to the walk-through of the website. The rule analysis module 350 can then compare the analytic element behaviors to rules stored within the rule database 240. Based upon the determinations of the rule analysis module 350, an analytic elements report 330*c* can be generated. The report 330*c* can describe various identified analytic elements that violated one or more rules.

In at least one implementation, the report 330*c* may also comprise source code that the rule analysis module 350 generated to correct the non-conforming analytic elements. For example, a particular tag may comprise an incorrect naming convention. The rule analysis module 350 may automatically generate source code for the tag that conforms with the naming convention. Additionally, in at least one implementation, the generated source code can be automatically provided to the web server 100 and incorporated into the webpage store 305. As such, in at least one implementation, the rule analysis module 350 can identify non-conforming analytic elements and automatically generate code that can replace the non-conforming analytic element source code.

Figure 4:
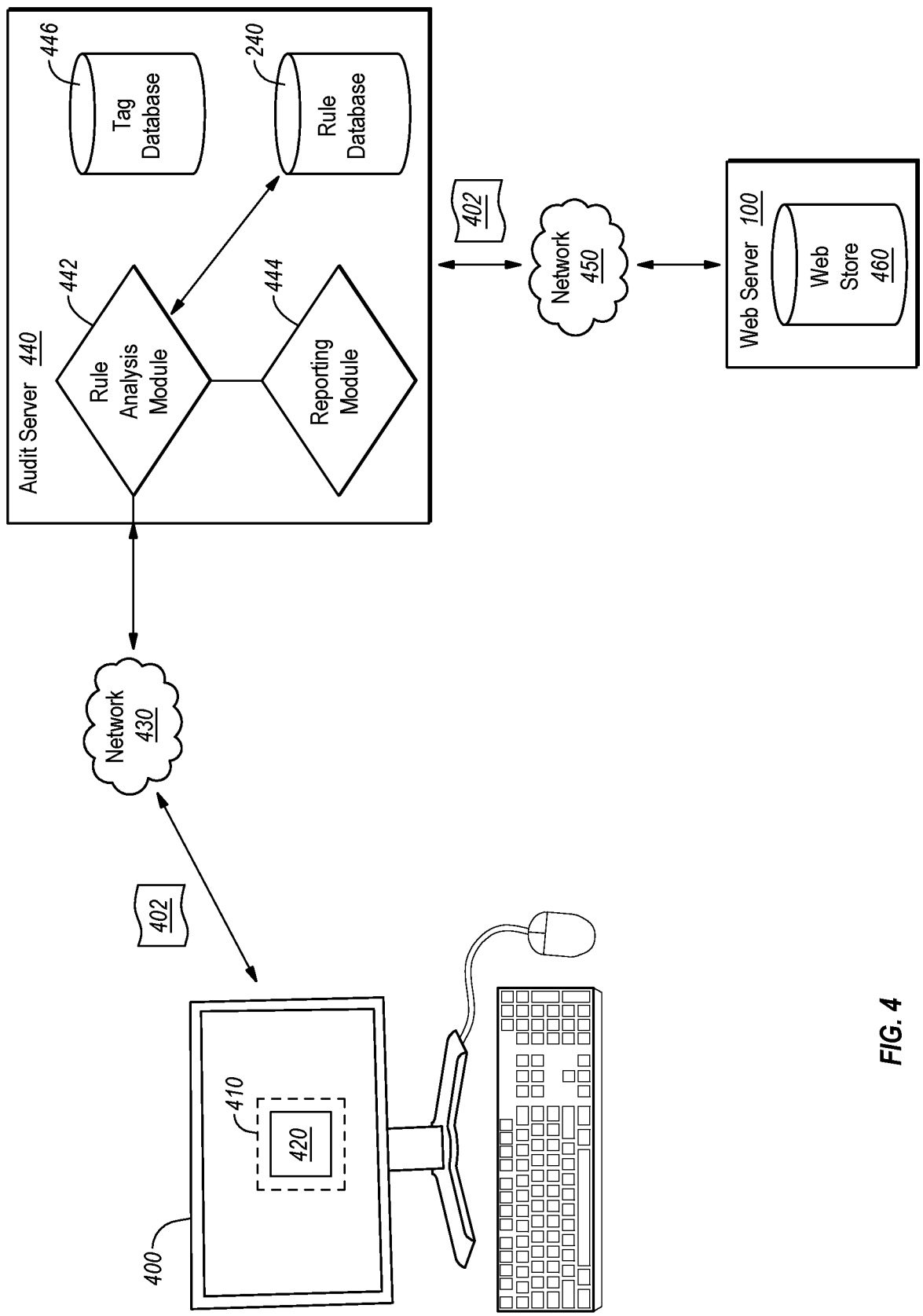
FIG. 4 illustrates a schematic of another network-based analytic element audit system in accordance with implementations of the present invention.

FIG. 4 illustrates a schematic of another network based analytic element audit system in accordance with implementations of the present invention. The schematic of FIG. 4 has been simplified to only show portions of interest. The network-based analytic element audit system of FIG. 4 may comprise a system for analyzing web-connected software applications. For example, in at least one implementation, a mobile application 420 can be executed on an end-user computer 400 within a virtual machine 410. The network communications 402 generated by the mobile application 420 can be routed through an audit server 440. In at least one implementation, the audit server 440 functions as a network proxy for network communications 402 generated by the mobile application 420. While FIG. 4 depicts the end-user computer 400 and the mobile application 420 in communication with the audit server 440 through a network communication channel 430, in at least one implementation, the audit server 440 is executed within the same end-user computer 400 as the virtual machine 410 and the mobile application 420.

When functioning as a proxy for the mobile application 420, the audit server 440 can receive network communications 402 from the mobile application 420, analyze the communications for analytic elements, and then forward the communication 402 to its intended web server destination 100 through a network communication channel 450. The web server 100 may then gather data from a web store 460 and communicate the data to the audit server 440, which in turn can communicate the data to the mobile application 420.

When analyzing the network communications 402, the audit server 440 may utilize a rule analysis module 442 that identifies analytic elements (e.g., tags) based upon signatures found in the network communications 402. The signatures may be stored within a tag database 446. Additionally, the rule analysis module 442 may analyze the identified analytic elements to determine if they conform to rules stored within a rule database 240. The audit server 440 can also utilize a reporting module 444 to generate reports 330*c* similar to those described above.

Accordingly, FIGS. 1-4 and the corresponding text illustrate or otherwise describe one or more components, modules, and/or mechanisms for managing rules for network-based analytic elements. In particular, in at least one implementation, the present invention can analyze a dataset of analytic information and generate a set of rules based upon identified patterns within the dataset. One will appreciate that implementations of the present invention can also be described in terms of flowcharts comprising one or more acts for accomplishing a particular result. For example, FIGS. 5 and 6 and the corresponding text describe acts in a method for managing rules for network-based analytic elements. The acts of FIGS. 5 and 6 are described below in connection with the schematics and components of FIGS. 1-4.

Figure 5:
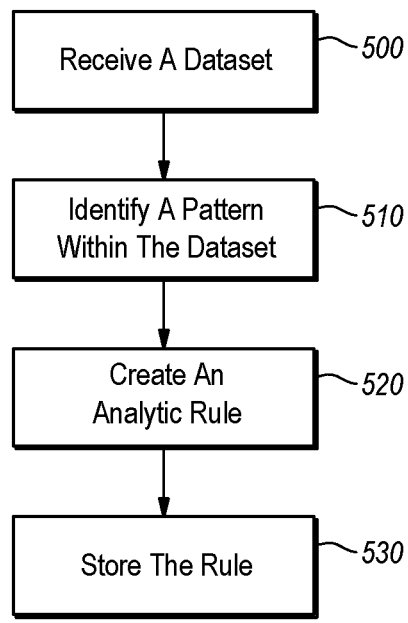
FIG. 5 illustrates a flow chart of a series of acts in a method in accordance with an implementation of the present invention for managing analytic elements.
Figure 6:
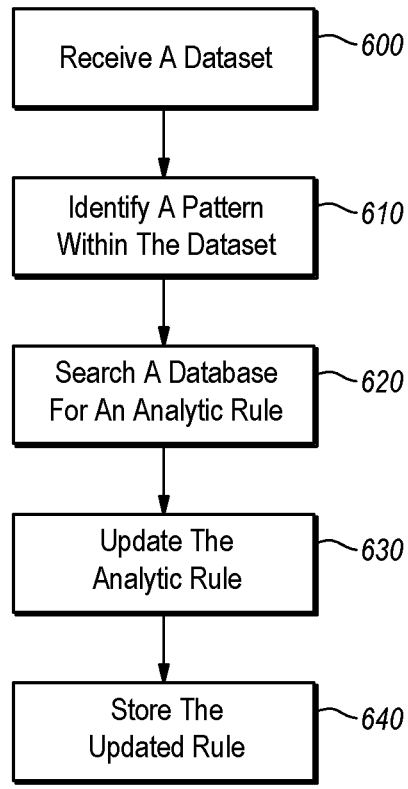
FIG. 6 illustrates another flow chart of a series of acts in a method in accordance with an implementation of the present invention for managing analytic elements.

For example, FIG. 5 illustrates that a method for managing rules for network-based analytic elements can include an act 500 of receiving a dataset. Act 500 can comprise receiving, at the computer system, a dataset of information for network-based analytic elements. The dataset can comprise information received by a network-based destination of the analytic elements. The analytic elements may be executed within a network-connected software application.

For example, FIG. 2 depicts a rule creation software application 200 that receives a dataset of analytics information from an analytics database 140. As depicted in FIG. 1, the dataset of analytics information can comprise information that was received at an analytics server 130 in response to the execution of an analytics element at an end-user computer 120(*a-c*). Additionally, as depicted and described in FIGS. 3 and 4 the analytics elements can be executed within a web browser interface (e.g., FIG. 3), within a mobile application (e.g., FIG. 4), or within any other network-connected software application.

Additionally, FIG. 5 shows that the method can include an act 510 of identifying a pattern within the dataset. Act 510 can comprise identifying, with a computer processor, a pattern within the dataset of information. For example, as depicted in FIG. 2 and described in the accompanying description, a rule creation software application 200 can comprise an analytics analysis module 220, which in turn can apply any number of conventional pattern recognition algorithms to the dataset of information. Additionally, various rule seeds and pre-existing rules can be utilized to identify patterns within the dataset.

FIG. 5 also shows that the method can include an act 520 of creating an analytic rule. Act 520 can comprise, based upon the identified pattern, creating an analytic element rule that is configured to describe the identified pattern on at least a subset of network-based analytic elements that are executable within the network-connected software application. For example, as depicted in FIG. 2, the rule creation module 230 can receive the identified patterns from the analytics analysis module 220. The rule creation module can then generate one or more rules based upon the identified patterns. For example, the rule creation module 230 can generate rules that describe a particular bread crumb naming convention. Similarly, the rule creation module 230 can create rules that describe specific analytic elements that should be associated with specific variables.

Further, FIG. 5 shows that the method can include an act 530 of storing the rule. Act 530 can comprise storing, within a digital database, the analytic element rule, wherein the digital database comprises a set of analytic element rules for managing analytic elements within the network-connected software application. For example, as depicted in FIG. 2, once the rule creation module 230 creates a rule, the rule can be stored within the rule database 240.

As an additional or alternative implementation, FIG. 6 illustrates that a method for managing rules for network-based analytic elements can include an act 600 of receiving a dataset. Act 600 can comprise receiving, at the computer system, a dataset of information for network-based analytic elements. The dataset can comprise information received by a network-based destination of the analytic elements. The analytic elements may be executed within a network-connected software application. For example, FIG. 2 depicts a rule creation software application 200 that receives a dataset of analytics information from an analytics database 140. As depicted in FIG. 1, the dataset of analytics information can comprise information that was received at an analytics server 130 in response to the execution of an analytics element at an end-user computer 120(a-c). Additionally, as depicted and described in FIGS. 3 and 4 the analytics elements can be executed within a web browser interface (e.g., FIG. 3), within a mobile application (e.g., FIG. 4), or within any other network-connected software application.

Additionally, FIG. 6 shows that the method can include an act 610 of identifying a pattern within the dataset. Act 610 can comprise identifying, with a computer processor, a pattern within the dataset of information. For example, as depicted in FIG. 2, an analytics analysis module 220 can apply any number of conventional pattern recognition algorithms to the dataset of information. Additionally, various rule seeds and pre-existing rules can be utilized to identify patterns within the dataset.

FIG. 6 also shows that the method can include an act 620 of searching a database for an analytic rule. Act 620 can comprise searching, within a database of analytic rules, for an analytic rule that describes at least a portion of the identified pattern. For example, as depicted in FIG. 2, the rule creation module 230 can search the rule database 240 for a pre-existing rule that describes an identified patterns within the dataset of analytics information.

Further, FIG. 6 shows that the method can include an act 630 of updating the analytic rule. Act 630 can comprise, based upon identified differences in the identified pattern and the analytic rule, updating the analytic rule to incorporate the differences. For example, as depicted in FIG. 2, the rule creation module 230 can identify a pre-existing rule that partially describes an identified pattern. In at least one implementation, the rule creation module can manipulate or replace the rule such that it describes the entire identified pattern. For instance, the pre-existing rule may describe a particular variable that is associated with a particular analytic element. The rule creation module 230, however, may identify a pattern where a second particular variable is also associated with the particular analytic element. Based upon the identified difference between the pre-existing rule and the identified pattern, the rule creation module 230 can update the pre-existing rule, such that it includes both variables.

Further still, FIG. 6 shows that the method can include an act 640 of storing the updated rule. Act 640 can comprise storing, within the database of analytic rules, the analytic rule, wherein the database of analytic rules comprises a set of analytic rules for managing analytic elements within the network-connected software application. For example, as depicted in FIG. 2, once the rule creation module 230 creates the updated rule, the rule can be stored within the rule database 240.

Accordingly, implementations of the present invention provide significant improvements over the prior art. For example, implementations of the present invention provide a unified system for identifying analytic element rules and updating a dataset of the rules. As such, implementations of the present invention provide a technical benefit of conforming source code associated with analytic elements to standards that are universal across a specific product.

Additionally, implementations of the present invention increase the reliability of analytics information by ensuring that each element conforms with analytic rules. One of skill in the art will understand that non-conforming analytic element may lead to lost data, incorrect data, and other such problems within the resulting analytics.

Although the subject matter has been described in language specific to structural features, modules, and/or methodological acts, it is to be understood that the subject matter defined in the appended claims is not necessarily limited to the described features, modules, or acts described above, or the order of the acts described above. Rather, the described features, modules, and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system.

Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computerized method comprising computer-executable instructions that when implemented at a computer system that include one or more processors, perform a method for managing rules within a network-based analytic elements system, the method comprising:
   receiving, at the computer system, a dataset of information for network-based analytic elements, wherein:
      the dataset comprises information received by a network-based destination of the analytic elements, and
      the analytic elements were executed within a network-connected software application;
   identifying, with at least one of the one or more processors, a pattern within the dataset of information;
   searching, within a database of analytic element rules, for an analytic element rule that describes at least a portion of the identified pattern;
   determining the analytic element rule is editable because the analytic element rule is outside of an age threshold, wherein the age threshold comprises a lower limit under which the analytic element rule is not editable and an upper limit above which the analytic element rule is not editable;

based upon identified differences in the identified pattern and the analytic element rule, updating the analytic element rule to incorporate the differences;

storing, within the database of analytic element rules, the updated analytic element rule, wherein the database of analytic element rules comprises a set of analytic element rules for managing analytic elements within the network-connected software application;

executing, at least one of the one or more processors, the network-connected software application;

capturing network communications generated by the network-connected software application; and identifying a captured network communication that comprises a non-conforming analytic element that does not conform to the updated analytic element rule.

2. The method as recited in claim 1, wherein the network-connected software application comprises a native application on a mobile device.

3. The method as recited in claim 1, wherein the network-connected software application comprises a virtual machine.

4. The method as recited in claim 1, further comprising generating a report indicating the non-conforming analytic element.

5. The method as recited in claim 1, further comprising:
accessing, at least one of the one or more processors, source code associated with the non-conforming analytic element, wherein the source code is executable within the network-connected software application; and
when the analytic element rule is within the age threshold, adjusting the source code of the non-conforming analytic element to conform with the updated analytic element rule.

6. The method as recited in claim 5, wherein the network-connected software application comprises a web browser and the source code comprises source code for a webpage.

7. The method as recited in claim 1, wherein the network analytics element comprises a network request initiated by a client based upon content that is delivered to the client.

8. The method as recited in claim 1, wherein the network analytics element comprises a tracking pixel.

9. The method as recited in claim 1, wherein the analytic rule comprises a naming convention for an HTML tag.

10. A computer system for managing rules for network-based analytic elements comprising:
one or more processors;
one or more storage devices having stored thereon computer-executable instructions that are executable by the one or more processors, and, when executed, cause the computer system to perform at least the following:
receive, at the computer system, a dataset of information for network-based analytic elements, wherein:
the dataset comprises information received by a network-based destination of the analytic elements, and
the analytic elements were executed within a network-connected software application;
identify, with at least one of the one or more processors, a pattern within the dataset of information;
search, within a database of analytic element rules, for an analytic element rule that describes at least a portion of the identified pattern;
determine the analytic element rule is editable because the analytic element rule is outside of an age threshold, wherein the age threshold comprises a lower limit under which the analytic element rule is not editable and an upper limit above which the analytic element rule is not editable;

based upon identified differences in the identified pattern and the analytic element rule, update the analytic element rule to incorporate the differences;

store, within a digital database, the updated analytic element rule, wherein the digital database comprises a set of analytic element rules for managing analytic elements within the network-connected software application;

execute, at least one of the one or more processors, the network-connected software application;

capture network communications generated by the network-connected software application; and identify a captured network communication that comprises a non-conforming analytic element that does not conform to the updated analytic element rule, wherein a processor determines when the captured network communication that comprises the non-conforming analytic element does not conform to the updated analytic element rule.

11. The system as recited in claim 10, wherein the network-connected software application comprises a web browser.

12. The system as recited in claim 10, further comprising computer-executable instructions that configure the computer system to perform at least the following: generate a report indicating the non-conforming analytic element.

13. The system as recited in claim 10, further comprising computer-executable instructions that configure the computer system to perform at least the following:
access, with at least one of the one or more processors, source code associated with the non-conforming analytic element, wherein the source code is executable within the network-connected software application; and
when the analytic element rule is within the age threshold, adjust the source code of the non-conforming analytic element to conform with the created analytic element rule.

14. The system as recited in claim 13, wherein the network-connected software application comprises a web browser and the source code comprise source code for a webpage.

15. The system as recited in claim 10, wherein the analytic elements comprise a network request initiated by a client based upon content that is delivered to the client.

16. The system as recited in claim 10, wherein the analytic elements comprise a tracking pixel.

17. The system as recited in claim 10, wherein the created analytic element rule comprises a naming convention for an HTML tag.

18. A computer program product stored on one or more non-transitory hardware storage devices, in the form of computer-executable instructions that are executable by one or more processors of a computer system and that, when executed by the processors, cause the computer system to manage rules within a network-based analytic elements system, including computer-executable instructions that configure the computer system to perform at least the following:
receive, at the computer system, a dataset of information for network-based analytic elements, wherein:
the dataset comprises information received by a network-based destination of the analytic elements, and
the analytic elements were executed within a network-connected software application;
identify, with a computer processor, a pattern within the dataset of information;

search, within a database of analytic element rules, for an analytic element rule that describes at least a portion of the identified pattern;

determine the analytic element rule is editable because the analytic element rule is outside of an age threshold, wherein the age threshold comprises a lower limit under which the analytic element rule is not editable and an upper limit above which the analytic element rule is not editable;

based upon identified differences in the identified pattern and the analytic element rule, update the analytic element rule to incorporate the differences;

store, within a digital database, the created updated analytic element rule, wherein the digital database comprises a set of analytic element rules for managing analytic elements within the network-connected software application;

execute, at least one of the one or more processors, the network-connected software application;

capture network communications generated by the network-connected software application; and identify a captured network communication that comprises a non-conforming analytic element that does not conform to the updated analytic element rule, wherein a processor determines when the captured network communication that comprises the non-conforming analytic element does not conform to the updated analytic element rule.

* * * * *